(12) United States Patent
Hirvonen et al.

(10) Patent No.: US 11,567,568 B2
(45) Date of Patent: Jan. 31, 2023

(54) DISPLAY APPARATUSES AND METHODS INCORPORATING FOVEATED RENDERING

(71) Applicant: Varjo Technologies Oy, Helsinki (FI)

(72) Inventors: Antti Hirvonen, Espoo (FI); Jarno Wuolijoki, Helsinki (FI); Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 20 days.

(21) Appl. No.: 17/184,684

(22) Filed: Feb. 25, 2021

(65) Prior Publication Data

US 2022/0269340 A1   Aug. 25, 2022

(51) Int. Cl.
| | |
|---|---|
| G06F 3/01 | (2006.01) |
| G02B 27/00 | (2006.01) |
| G06T 19/00 | (2011.01) |
| G06T 3/40 | (2006.01) |
| G02B 27/01 | (2006.01) |
| G06V 40/19 | (2022.01) |

(52) U.S. Cl.
CPC ......... G06F 3/013 (2013.01); G02B 27/0093 (2013.01); G02B 27/0172 (2013.01); G06F 3/017 (2013.01); G06T 3/40 (2013.01); G06V 40/19 (2022.01); *G06T 19/006* (2013.01)

(58) Field of Classification Search
CPC ....... G06F 3/013; G06F 3/017; G06T 19/006; G06T 3/40; G09G 5/397; G02B 27/0093; G02B 27/0172; G06V 40/19
See application file for complete search history.

(56) References Cited

U.S. PATENT DOCUMENTS

| | | | |
|---|---|---|---|
| 10,878,614 B2 * | 12/2020 | Surti ................. | H04N 5/3696 |
| 2018/0227630 A1 * | 8/2018 | Schmidt ............ | H04N 21/4223 |
| 2018/0286320 A1 * | 10/2018 | Tardif ............... | G09G 3/025 |
| 2019/0019315 A1 * | 1/2019 | Bastani ............. | H04N 19/174 |
| 2021/0278678 A1 * | 9/2021 | Brannan ........... | G02B 27/0093 |

\* cited by examiner

*Primary Examiner* — Nhat Huy T Nguyen
(74) *Attorney, Agent, or Firm* — Ziegler IP Law Group, LLC (57) ABSTRACT

A display apparatus including first and second light sources, gaze-tracking means, and processor(s) configured to: process gaze-tracking data to determine gaze direction; identify gaze region; determine first and second portions of gaze region; send, to rendering server, resolution information indicative of at least one of: gaze direction, gaze region, first and second portions of gaze region, different required resolutions of at least two input images; receive said input images comprising first input image(s) and second input image(s), from rendering server; process first input image(s) to generate first region of first output image and second region of second output image; process second input image(s) to generate remaining regions of first and second output images; and display first and second output images via first and second light sources.

16 Claims, 6 Drawing Sheets

DISPLAY APPARATUSES AND METHODS INCORPORATING FOVEATED RENDERING

TECHNICAL FIELD

The present disclosure relates to display apparatuses and rendering servers incorporating foveated rendering. Moreover, the present disclosure relates to methods of displaying that are implemented by such display apparatuses.

BACKGROUND

In recent times, immersive technologies such as virtual-reality, augmented-reality, mixed-reality (collectively referred to as extended-reality (XR) technology) are being employed in various fields such as entertainment, real-estate, combat training, medical imaging operations, simulators, navigation, and the like. Notably, immersive technologies are employed in display apparatuses to provide immersive XR environments to a user. The display apparatus may include a head-mounted device (HMD) at which images corresponding to the XR environment are displayed, wherein the HMD receives rendering images constituting the XR environment from a rendering server.

Typically, there exist multiple display apparatuses for displaying XR environments. In a first instance, the display apparatus may employ a single-resolution display. In such instance, the XR environment provided by single-resolution images fails to provide an immersive experience to the user when the single-resolution images are displayed via the single-resolution display. In a second instance, multiple displays or projectors (per eye of the user) having a same resolution may be employed in the display apparatus to display images constituting the XR environment. However, the XR environment provided by the images displayed via the multiple displays or projectors is sub-optimal, as projections of the images are not properly optically combined and provide a disjointed visual scene of the XR environment. In a third instance, the display apparatus may employ fixed foveated displaying, such as at a multiresolution display or using projector(s) of the display apparatus. In such instance, a gaze direction of the user is assumed to be directed towards a central portion of a viewport of the display apparatus, wherein an image corresponding to the central portion of the viewport is rendered at a higher resolution than an image corresponding to a remaining portion of the viewport. Such display apparatus always present XR environments having high resolution in the central portion of the viewport and low resolution in the remaining portion of the viewport, which may not always be consistent with a manner in which the user's gaze can freely move around an entirety of the viewport. Such XR environment have limited realism.

Furthermore, rendering images constituting complex and realistic XR environments is computationally intensive and time-consuming. This causes excessive processing burden on the rendering server, especially when the images are required to be displayed at high frame rates and varying resolutions for providing a visually pleasing foveated XR environments to the user. Overburdening of the rendering server leads to an increase in rendering time and effort, which is detrimental to usability of both the rendering server and the display apparatus, and adversely impacts immersiveness and realism within the XR environment.

Therefore, in light of the foregoing discussion, there exists a need to overcome the aforementioned drawbacks associated with existing display apparatuses for presenting XR environments to users.

SUMMARY

The present disclosure seeks to provide a display apparatus incorporating foveated rendering. The present disclosure also seeks to provide a method of displaying that is implemented by such display apparatus. An aim of the present disclosure is to provide a solution that overcomes at least partially the problems encountered in prior art.

In one aspect, an embodiment of the present disclosure provides a display apparatus comprising:

a first light source and a second light source per eye, the first light source and the second light source being employed to provide a viewport;

gaze-tracking means; and at least one processor configured to:

process gaze-tracking data, collected by the gaze-tracking means, to determine a gaze direction of a user;

identify, based on the gaze direction, a gaze region within the viewport;

determine a first portion and a second portion of the gaze region in which a first region of a first output image and a second region of a second output image are to be displayed, respectively;

send, to a rendering server, resolution information indicative of at least one of: the gaze direction of the user, the gaze region within the viewport, the first portion and the second portion of the gaze region, different resolutions in which at least two input images are required;

receive the at least two input images from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image;

process the at least one first input image to generate the first region of the first output image and the second region of the second output image;

process the at least one second input image to generate a remaining region of the first output image and a remaining region of the second output image; and display the first output image and the second output image via the first light source and the second light source, respectively, a projection of the first output image and a projection of the second output image producing a visual scene in the viewport.

In another aspect, an embodiment of the present disclosure provides a method of displaying, the method being implemented by a display apparatus comprising a first light source and a second light source per eye and gaze-tracking means, the method comprising:

processing gaze-tracking data, collected by the gaze-tracking means, to determine a gaze direction of a user;

identifying, based on the gaze direction, a gaze region within a viewport provided by the first light source and the second light source;

determining a first portion and a second portion of the gaze region in which a first region of a first output image and a second region of a second output image are to be displayed, respectively;

sending, to a rendering server, resolution information indicative of at least one of: the gaze direction of the user, the gaze region within the viewport, the first portion and the second portion of the gaze region, different resolutions in which at least two input images are required;

receiving the at least two input images from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image;

processing the at least one first input image to generate the first region of the first output image and the second region of the second output image;

processing the at least one second input image to generate a remaining region of the first output image and a remaining region of the second output image; and displaying the first output image and the second output image via the first light source and the second light source, respectively, a projection of the first output image and a projection of the second output image producing a visual scene in the viewport.

Embodiments of the present disclosure substantially eliminate or at least partially address the aforementioned problems in the prior art, and enable foveated rendering of output images for displaying at the display apparatus, in a manner that the rendering server is not excessively computationally overburdened, and without compromising on user experience of an XR environment constituted by such output images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3D illustrates a first input image, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

a first light source and a second light source per eye, the first light source and the second light source being employed to provide a viewport;

gaze-tracking means; and at least one processor configured to:

process gaze-tracking data, collected by the gaze-tracking means, to determine a gaze direction of a user;

identify, based on the gaze direction, a gaze region within the viewport;

determine a first portion and a second portion of the gaze region in which a first region of a first output image and a second region of a second output image are to be displayed, respectively;

send, to a rendering server, resolution information indicative of at least one of: the gaze direction of the user, the gaze region within the viewport, the first portion and the second portion of the gaze region, different resolutions in which at least two input images are required;

receive the at least two input images from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image;

process the at least one first input image to generate the first region of the first output image and the second region of the second output image;

process the at least one second input image to generate a remaining region of the first output image and a remaining region of the second output image; and display the first output image and the second output image via the first light source and the second light source, respectively, a projection of the first output image and a projection of the second output image producing a visual scene in the viewport.

In another aspect, an embodiment of the present disclosure provides a method of displaying, the method being implemented by a display apparatus comprising a first light source and a second light source per eye and gaze-tracking means, the method comprising:

processing gaze-tracking data, collected by the gaze-tracking means, to determine a gaze direction of a user;

identifying, based on the gaze direction, a gaze region within a viewport provided by the first light source and the second light source;

determining a first portion and a second portion of the gaze region in which a first region of a first output image and a second region of a second output image are to be displayed, respectively;

sending, to a rendering server, resolution information indicative of at least one of: the gaze direction of the user, the gaze region within the viewport, the first portion and the second portion of the gaze region, different resolutions in which at least two input images are required;

receiving the at least two input images from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image;

processing the at least one first input image to generate the first region of the first output image and the second region of the second output image;

processing the at least one second input image to generate a remaining region of the first output image and a remaining region of the second output image; and displaying the first output image and the second output image via the first light source and the second light source, respectively, a projection of the first output image and a projection of the second output image producing a visual scene in the viewport.

The present disclosure provides the aforementioned display apparatus and the aforementioned method incorporating foveated rendering in order to reduce a processing burden on the rendering server without compromising on user experience within XR environment. Herein, the at least one processor is configured to send, to the rendering server, the resolution information, to enable the rendering server in efficiently generating the at least two input images of different required resolutions, based on the gaze direction of the user. In such a case, the rendering server generates the at least two input images by utilizing minimal rendering resources and rendering time. Therefore, overburdening of the rendering server would not occur during rendering of said input images and a computational burden on the rendering server is thus reduced. These at least two input images are then processed by the at least one processor (namely, a compositor) to generate different regions of the first output image and the second output image. Different regions of the first output image and the second output image are generated, from varying-resolution input images, to emulate foveation characteristics of the human visual system. Specifically, gaze-contingent regions of the first and second output images are generated using higher-resolution input image(s), while remaining regions of the first and second output images are generated using lower-resolution input image(s). Therefore, upon displaying, the first and second output images beneficially provide immersiveness and realism within visual scene of the XR environment. The method is fast, reliable and can be implemented with ease.

Throughout the present disclosure, the term "display apparatus" refers to a display system that is configured to present an extended-reality (XR) environment to the user when the display apparatus in operation is used by the user. Herein, the term "extended-reality" encompasses virtual reality (VR), augmented reality (AR), mixed reality (MR), and the like.

In one implementation, the display apparatus is implemented as a head-mounted device (HMD) and a computer coupled to the HMD. In one case, the HMD comprises the first light source and the second light source per eye and the gaze-tracking means, while the computer comprises the at least one processor. Therefore, compositing tasks pertaining to presentation of the XR environment are entirely performed at the computer, by the at least one processor. In another case, the HMD comprises the first light source and the second light source per eye and the gaze-tracking means, and the at least one processor is implemented at both the HMD and the computer. Therefore, compositing tasks pertaining to presentation of the XR environment are performed in a shared manner at both the HMD and the computer, by the at least one processor. The computer may be coupled to the HMD wirelessly and/or in a wired manner. Examples of the computer include, but are not limited to, a desktop computer, a laptop computer, a tablet computer, a workstation, and an XR console.

In another implementation, the display apparatus is implemented as an HMD. In such a case, the HMD comprises the first light source and the second light source per eye, the gaze-tracking means, and the at least one processor. Therefore, compositing tasks pertaining to presentation of the XR environment are entirely performed at the HMD, by the at least one processor.

It will be appreciated that the HMD is worn by the user on his/her head. The HMD is implemented, for example, as an XR headset, a pair of XR glasses, and the like, that is operable to display a visual scene of the XR environment to the user.

Throughout the present disclosure, the term "light source" refers to an element from which light emanates. Optionally, a given light source is to implemented as a display. In this regard, a given output image is displayed at the display. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, a given light source is implemented as a projector. In this regard, a given output image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector. Throughout the present disclosure, the term "viewport" refers to a viewing region of the display apparatus. The visual scene of the XR environment is shown within the viewport, to the user. It will be appreciated that an entire field of view of the viewport is made visible to the user.

Optionally, the given light source is a single-resolution light source. The single-resolution light source is configured to display the given output image at a single display resolution (namely, a uniform display resolution) only. Optionally, the first light source and the second light source are configured to display the first output image and the second output image, respectively, at different display resolutions, the display resolution of the second light source being higher than the display resolution of the first light source. The term "display resolution" of the given light source refers to a total number of pixels in each dimension of the given light source, or to a pixel density (namely, the number of pixels per unit distance or area) of the given light source.

It will be appreciated that the first light source and the second light source are arranged at fixed positions within the HMD and each of them have uniform display resolutions, but they are utilized to provide active foveated displaying to a certain extent. The user typically gazes around a central portion of the viewport. When his/her gaze shifts more than 30 degrees from the central portion, the user typically turns his/her head instead of gazing at a periphery of the viewport. As a result, the user's gaze still remains within 30 degree to 40 degrees from the central portion of the viewport. In the display apparatus, resolution information is sent to the rendering server in order to enable the rendering server to efficiently generate the at least two input images in a manner that upon processing the at least two input images (by the at least one processor) to generate the first output image and the second output image, the visual scene produced by projections of the first and second output images is actively foveated according to a current gaze of the user.

The at least one processor is communicably coupled to the first light source, the second light source, and the gaze-tracking means. The at least one processor is also communicably coupled to the rendering server. The at least one processor could be a processor of the HMD and/or a processor of the computer communicably coupled to the HMD. It will be appreciated that any such coupling can be wireless and/or in a wired manner. The at least one processor may be understood to be a compositor (namely, a processing unit that is configured to perform at least the compositing tasks). The compositor is a software module taking various inputs (such as the at least two input images) and composing (namely, building or generating) the output image frames to be displayed via the image renderer.

Throughout the present disclosure, the term "gaze-tracking means" refers to a specialized equipment for detecting and/or following gaze of the user, when the HMD in operation is worn by the user. The gaze-tracking means could be implemented as contact lenses with sensors, cameras monitoring a position of a pupil of the user's eye, and the like. Such gaze-tracking means are well-known in the art. Notably, the gaze-tracking means is configured to collect the gaze-tracking data. It will be appreciated that the gaze-tracking data is collected repeatedly by the gaze-tracking means, as the gaze of the user's eyes keeps changing whilst he/she uses the HMD. An up-to-date gaze-tracking data indicative of the gaze direction of the user allows for producing an up-to-date gaze-contingent XR environment for presenting at the HMD.

Throughout the present disclosure, the term "gaze direction" refers to a direction in which the user's eye is gazing. The gaze direction may be represented by a gaze vector. Optionally, when processing the gaze-tracking data, the at least one processor is configured to employ at least one of: an image processing algorithm, a feature extraction algorithm, a data processing algorithm. Other suitable algorithm(s) can also be employed. Notably, the gaze direction is used to identify the gaze region within the viewport. In this regard, the at least one processor is optionally configured to map the gaze direction of the user onto the viewport to identify the gaze region within the viewport. This gaze region may also be known as a "region of interest" or a "gaze area" within the viewport, as the gaze direction of the user is directed towards this gaze region. The gaze region of the XR environment is perceived with high visual acuity by foveas of the user's eyes, and in such a case, the display apparatus can emulate active foveation of the human visual system. Optionally, the gaze region lies within a range of 0 degrees to 40 degrees from a centre of the viewport. For example, the gaze region may lie from 0, 5, 10, 15, 20, 25, 30 or 35 degrees up to 5, 10, 15, 20, 25, 30, 35 or 40 degrees from the centre of the viewport. It will be appreciated that in the display apparatus, the gaze region does not necessarily lie at the centre of the viewport but can also lie away from the centre, to a certain extent. The visual scene produced in the viewport is actively foveated according to a location of the gaze region in the viewport. The gaze region is divided into the first portion and the second portion, wherein the first portion is to be displayed via the first light source as the first region of the first output image and the second portion is to be displayed via the second light source as the second region of the second output image. In some implementations, the first portion and the second portion at least partially overlap with each other, whereas in other implementations, the first portion and the second portion are non-overlapping.

Optionally, the at least one processor is configured to:
determine a quality of the gaze-tracking data; and
adjust a size of the gaze region based on the quality of the gaze-tracking data.

Optionally, the quality of the gaze-tracking data depends on gaze-tracking accuracy and gaze-tracking latency. The quality of the gaze-tracking data is directly proportional to the gaze-tracking accuracy, and is inversely proportional to the gaze-tracking latency. The gaze-tracking accuracy is indicative of correctness in determining the gaze direction of the user. The gaze-tracking latency is indicative of a delay in determining the gaze direction of the user. Such a delay adversely affects the user's experience within the XR environment. Lesser the gaze-tracking latency, greater is the quality of the gaze-tracking data. A low gaze-tracking latency allows for producing the up-to-date gaze-contingent XR environment for presenting at the HMD. It will be appreciated that the gaze-tracking accuracy and the gaze-tracking latency are prominent characteristics of the gaze-tracking means described herein.

It will be appreciated that greater the quality of the gaze-tracking data, smaller the size of the gaze region, and vice versa. A greater size of the gaze region is associated with a low quality of the gaze-tracking data, as the greater size of the gaze region is identified to compensate for inaccuracies in the low quality of the gaze-tracking data. Conversely, a small size of the gaze region is associated with a high quality of the gaze-tracking data, as the small size of the gaze region can be identified due to accuracies and precision in the high quality of the gaze-tracking data. The greater size of the gaze region requires considerable rendering time and/or rendering effort whereas, the small size of the gaze region requires minimal rendering time and/or rendering effort by the rendering server when generating the at least one first input image corresponding to the gaze region. Therefore, high-quality gaze-tracking data is beneficial in reducing computational burden on the rendering server.

Optionally, the quality of the gaze-tracking data is determined based on at least one of: a sample age of historically stored gaze directions of the user, a type of the gaze-tracking means, a number of the gaze-tracking means, noise in the gaze-tracking data, a configuration of the gaze-tracking means. In an example, greater the sample age of (namely, older are) the historically stored gaze directions of the user, lower may be the quality of the gaze-tracking data as old samples are likely to be more unreliable as compared to newer samples. In another example, certain types of gaze-tracking means may be prone to more errors as compared to other types of gaze-tracking means, which may mean that gaze-tracking data obtained from these certain types of gaze-tracking means has lower quality than gaze-tracking data obtained from the other types of gaze-tracking means. In yet another example, lower the number of the gaze-tracking means, lower may be the quality of the gaze-tracking data.

Optionally, the quality of the gaze-tracking data is expressed as one of: a tolerance range about an acceptable level of quality, a probability value for accuracy of the gaze direction of the user, a score of a maximum possible quality, a percentage of a maximum possible quality. It will be appreciated that: a greater tolerance range about the acceptable level of quality is indicative of a lower quality of the gaze-tracking data, a higher probability value for accuracy of the gaze direction of the user is indicative of a higher quality of the gaze-tracking data, a higher score of the maximum possible quality is indicative of a higher quality of the gaze-tracking data, a higher percentage of the maximum possible quality is to indicative of a higher quality of the gaze-tracking data. As an example, the quality of the gaze-tracking data may be 90 percent, indicating that the gaze direction of the user is 90 percent accurate. Optionally, the score of the maximum possible quality lies in a range of 0 to 1. Here, 0 indicates lowest quality (or worst quality), while 1 indicates highest quality (or perfect quality). For example, the score of the maximum possible quality may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Alternatively, optionally, the score of the maximum possible quality lies in a range of 0 to 100. Here, 0 indicates lowest quality, while 100 indicates highest quality. For example, the score of the maximum possible quality may be from 0, 10, 20, 30, 40, 50, 60, 70, 80, or 90 up to 10, 20, 30, 40, 50, 60, 70, 80, 90 or 100.

Throughout the present disclosure, the term "rendering server" refers to a computer that is configured to execute a rendering application. The rendering application, when executed, performs rendering operations for XR applications. The rendering application acts as a server to the at least one processor. In one implementation, the display apparatus and the rendering server are communicably coupled via a data communication network. The data communication network may be wired, wireless or any combination thereof. In another implementation, the at least one processor (of the display apparatus) and the rendering server could be implemented on a same computer.

It will be appreciated that all information relating to VR applications resides with the rendering application, typically, in the form of a set of rules, objects, rendering buffers, and the like. In case of MR applications, for example, there is an additional virtual-world component which is superimposed on a real-world component. In such a case, the rendering operations for the MR applications are performed in a manner that the virtual-world component and the real-world component realistically interact with each other. Therefore, information pertaining to real-world objects in a real-world environment at which the user (of the HMD) is present is required by the rendering server for performing the rendering operations for the MR applications. This information may be obtained by the rendering server from at least one sensor (such as a camera, an ambient light sensor, and the like) arranged in the real-world environment either directly, or via the at least one processor. In an example, virtual objects are required to realistically reflect light emanating from real-world objects. In another example, when virtual objects include virtual light sources, a brightness of real-world objects in the MR applications is required to be adjusted accordingly.

The resolution information is required by the rendering server to generate the at least two input images with their required resolutions. The resolution information is sent to the rendering server in order to reduce rendering time and rendering effort of the rendering server, thereby easing the computational burden on the rendering server without compromising on user experience. It will be appreciated that the resolution information may be in at least one format (for example, such as an image format, an image format along with a control surface format, and the like). The resolution information is typically sent to the rendering server throughout a given XR session, in order to enable the rendering server to generate up-to-date input images (which are subsequently processed, by the at least one processor, to generate up-to-date output images) throughout the given XR session. When the resolution information is indicative of at least one of: the gaze direction, the gaze region, the first and second portions of the gaze region, such resolution information is dynamic (namely, variable) in nature and keeps changing during the given XR session. In such a case, upon each instance of change of the resolution information, an up-to-date resolution information is sent to the rendering server.

However, certain constituents of the resolution information need not be sent to the rendering server throughout the given XR session. It will be appreciated that when the display apparatus communicably connects with the rendering server at a beginning of the given XR session, the display apparatus and the rendering server establish rendering formats and/or parameters to be used during the given XR session to communicate to each other during the given XR session. These rendering formats and/or parameters could be static (namely, fixed) and may not change throughout the given XR session. Therefore, when the resolution information is indicative of the different resolutions required for the at least two input images, the different resolutions required may be sent by the at least one processor, to the rendering server at the beginning of the given XR session, when said resolutions required do not change throughout the given XR session.

Optionally, the at least one processor is configured to determine the different resolutions required for the at least two input images. Optionally, the different resolutions required for the at least two input images depends on the display resolution of the given light source. Optionally, in this regard, a required resolution of a given input image is greater than or equal to the display resolution of the given light source. Optionally, the different resolutions required for the at least two input images depends on a field of view of the given input image. The given input image corresponding to the gaze region has a small field of view and a high resolution.

Optionally, the display apparatus further comprises pose-tracking means, wherein the at least one processor is configured to:
   process pose-tracking data, collected by the pose-tracking means, to determine a head pose of the user; and
   send, to the rendering server, projection information indicative of the head pose of the user.

Herein, the term "pose-tracking means" refers to a specialized equipment for detecting and optionally, following changes in the head pose of the user, when the HMD is worn by the user. In practice, the aforesaid means is typically employed to track a pose of the HMD, and the head pose of the user corresponds to the pose of the HMD. Throughout the present disclosure, the term "head pose" encompasses both position and orientation of the head of the user. The position and the orientation of the user's head are used to determine a viewpoint and a view direction, respectively, from which the user is viewing a region (namely, a scene) of the XR environment. The viewpoint and the view direction of the user are indicative of a location and a perspective from which the user views the XR environment, respectively. Therefore, the viewpoint and the view direction of the user are effectively employed by the rendering server to accurately determine the region of the XR environment which would be visible to the user at a given time instant. Optionally, the projection information is processed by the rendering server to determine the viewpoint and the view direction of the user.

Optionally, the head pose of the user is determined in a three-dimensional coordinate space, which could be a global coordinate space of the XR environment. Furthermore, tracking of the head pose of the user is typically performed at a high frequency (for example, such as 1000 Hertz). The pose-tracking means could be implemented as at least one of: an optics-based tracking system (which utilizes, for example, infrared beacons and detectors, infrared cameras, visible-light cameras, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Such pose-tracking means are well-known in the art. Moreover, said means employs either an outside-in tracking technique or an inside-out tracking technique for collecting the pose-tracking data pertaining to the head pose of the user. As an example, said means may be implemented as Valve Corporation's SteamVR® tracking (that employs the outside-in tracking technique), where active lighthouses (that are detectable objects) sending infrared signals are installed at fixed locations in the real-world environment in which the HMD is being used. In such a case, the HMD comprises detectors that detect these infrared signals and determine the pose (namely, the position and orientation) of the HMD relative to the fixed locations of the lighthouses. As another example, said means may be implemented as a magnetic tracking system from Polhemus, where an active magnetic field is generated using a transmitter in the real-world environment, and at least one receiver that is capable of sensing the magnetic field is installed into the HMD.

Optionally, when the pose-tracking means is implemented as the optics-based tracking system which utilizes at least one camera arranged on the HMD, the projection information comprises at least one of: position of the at least one camera, orientation of the at least one camera, a horizontal field of view of the at least one camera, a vertical field of view of the at least one camera. In such a case, the position and the orientation of the at least one camera correspond to the head pose of the user. Moreover, the horizontal field of view and the vertical field of view of the at least one camera correspond to a field of view of the viewport. It will be appreciated that the field of view of the viewport may or may not be a fixed parameter. In such a case, the field of view of the viewport may or may not be required to be sent by the at least one processor, to the rendering server, for generation of the at least two input images. The field of view of the viewport may or may not be sent by the at least one processor, to the rendering server at the beginning of the given XR session. It will be appreciated that generation of the at least two input images depends on several factors such as the viewpoint, the view direction, lighting conditions in the XR environment, and the like.

In an embodiment, the projection information is dynamic. In this regard, the projection information dynamically changes (namely, is updated) based on the gaze vector. Optionally, the projection information is a function of gaze vector reliability. Optionally, the gaze vector reliability is received from the gaze-tracking means. Alternatively, optionally, the at least one processor is configured to determine the gaze vector reliability, based on the gaze-tracking data. In another embodiment, the projection information is static. Optionally, in this regard, the projection information is not based on the gaze vector. For example, the projection information may not follow the gaze vector, when the gaze vector is not generated (namely, is missing).

It will be appreciated that the resolution information and/or the projection information could be a function or a logic that is sent to the rendering server, in order to receive from the rendering server, the at least two input images to be processed, by the at least one processor to generate the first and second output images. The rendering server utilizes the resolution information, and additionally, optionally, the projection information, to generate the at least two input images having different resolutions. The rendering server takes into account limitations of the resolution information and/or the projection information (for example, such as inaccuracies/latency of the gaze direction, the gaze region, the head pose, and the like) and dynamically changes resolution and views/perspectives of the at least two input images based on these limitations.

Upon receiving the resolution information, the rendering server generates the at least two input images based on the resolution information. The at least two input images that are generated comprise the at least one first input image and the at least one second input image, the resolution of the at least one first input image is higher than the resolution of the at least one second input image. The term "resolution" of the given input image refers to a pixel density (namely, a number of pixels per unit distance or area or degree) in the given input image. The at least one processor is configured to process the at least one first input image and the at least one second input image to generate various regions of the first output image and the second output image. It will be appreciated that the at least one second input image corresponds to the entire field of view of the viewport, the at least one second input image would be processed to generate those regions of the first output image and the second output image which do not correspond to the gaze region.

The first output image and the second output image are images constituting the visual scene of the XR environment. Since the at least one first input image corresponds to the gaze region within the viewport, the at least one first input image is processed to generate the first region of the first output image and the second region of the second output image, wherein the first region represents the first portion of the gaze region, and the second region represents the second portion of the gaze region.

Optionally, when processing the at least one first input image to generate the first region and the second region, the at least one processor is configured to:

generate the first region of the first output image by resampling a first region of the at least one first input image that corresponds to the first region of the first output image; and generate the second region of the second output image by resampling a second region of the at least one first input image that corresponds to the second region of the second output image, wherein the first region of the at least one first input image overlaps partially with the second region of the at least one first input image, and wherein the first region and the second region of the at least one first input image are resampled differently.

Throughout the present disclosure, the term "resampling" refers to an image processing operation wherein a resolution of a given region of a given input image is changed to obtain a different resolution of a corresponding region of a given output image. In other words, when the given region of the given input image is resampled to generate the corresponding region of the given output image, a pixel density in the corresponding region of the given output image changes (namely, increases or decreases). It will be appreciated that the resampling encompasses both up-sampling (wherein pixel value of a given pixel in the given region of the given input image is used to yield pixel values for a group of pixels in corresponding region of the given output image), and down-sampling (wherein pixel values of a group of pixels in the given region of the given input image are combined to yield a single resultant pixel value of a single pixel in the corresponding region of the given output image). Down-sampling the given region of the given input image from a higher resolution to a lower resolution preserves, to a considerable extent, visual details in the given region.

Optionally, when a given region of the at least one first input image is down-sampled, the at least one processor is configured to employ at least one of: pixel binning, weighted averaging, non-weighted averaging, non-linear median filtering, minimum-maximum filtering, interpolation, image scaling (namely, image resizing). In an example, the at least one processor may employ the weighted to averaging. In such a case, in a given a set of pixels for which average of pixel values is to be calculated to yield a single resultant pixel value, some pixel values of the set contribute more towards the average than other pixel values of the set. In another example, the at least one processor may employ the non-weighted averaging. In such a case, in a given a set of pixels for which average of pixel values is to be calculated to yield a single resultant pixel value, all pixel values of the set contribute equally towards the average.

Optionally, the first region and the second region of the at least one first input image are resampled differently because the first light source and the second light source have different display resolutions. The resampling is performed to match the resolution of the first region of the first output image with the display resolution of the first light source, and to match the resolution of the second region of the second output image with the display resolution of the second light source.

The at least one second input image is processed to generate the remaining region of the first output image and the remaining region of the second output image since the at least one second input image corresponds to the entire field of view of the viewport and the remaining regions of the first and second output images do not correspond to the gaze region.

Optionally, when processing the at least one second input image to generate the remaining region of the first output image and the remaining region of the second output image, the at least one processor is configured to:

generate the remaining region of the first output image by resampling a third region of the at least one second input image that corresponds to the remaining region of the first output image; and generate the remaining region of the second output image by resampling a fourth region of the at least one second input image that corresponds to the remaining region of the second output image, wherein the third region and the fourth region of the at least one second input image are resampled differently.

In this regard, the third region and the fourth region of the at least one second input image are resampled differently because the first light source and the second light source have different display resolutions, and a resolution of the remaining region of the first output image is required to match the display resolution of the first light source, while a resolution of the remaining region of the second output image is required to match the display resolution of the second light source.

It will be appreciated that the at least one first input image (having high resolution) is processed to generate the first region of the first output image and the second region of the second output image that correspond to the first and second portions of the gaze region, respectively, while the at least one second input image (having lower resolution than the at least first input image) is processed to generate the remaining regions of the first and second output images. This enables the first output image and the second output image to emulate foveation within the XR environment, as their gaze-contingent regions provide higher visual detail as compared to their remaining regions.

In one implementation, the at least one first input image comprises a single input image A, while the at least one second input image comprises a single input image B, wherein the input image A has a higher resolution than the input image B. Herein, the first region of the first output image is generated by resampling its corresponding region within the input image A, while the remaining region of the first output image is generated by resampling its corresponding region within the input image B. The second region of the second output image is generated by resampling its corresponding region within the input image A, while the remaining region of the second output image is generated by resampling its corresponding region within the input image B.

In another implementation, the at least one first input image comprises an input image X, while the at least one second input image comprises two input images Y and Z, wherein a resolution of the input image X is greater than a resolution of the input image Y, which is greater than a resolution of the input image Z. Herein, the first region of the first output image is generated by resampling its corresponding region within the input image X, while the remaining region of the first output image is generated by resampling its corresponding region within the input image Z. The second region of the second output image is generated by resampling its corresponding region within the input image X, while the remaining region of the second output image is generated by resampling its corresponding region within the input image Y.

In yet another implementation, the at least one first input image comprises two input images K and L, while the at least one second input image comprises two input images M and N, wherein a resolution of the input image K is greater than a resolution of the input image L, which is greater a resolution of the input image M, which is greater a resolution of the input image N. Herein, the first region of the first output image is generated by resampling its corresponding region within the input image L, while the remaining region of the first output image is generated by resampling its corresponding region within the input image N. The second region of the second output image is generated by resampling its corresponding region within the input image K, while the remaining region of the second output image is generated by resampling its corresponding region within the input image M.

Optionally, when resampling the at least one first input image and the at least one second input image to generate the first and second output images, the at least one processor is configured to take into account various distortions due to optical components (of the display apparatus). Beneficially, this facilitates in reducing an effort required for resampling the at least one first input image and the at least one second input image while generating those regions of the first output image and the second output image which have little or no visual effect on the visual scene. It will be appreciated that optionally there are to be provided at least two resolutions in any given output image that is generated. Therefore, at least two shading rates are optionally required for generating the given output image, as these shading rates are related to resolutions provided in the given output image. Optionally, the at least one processor employs different shading rates to generate different regions of the given output image.

Optionally, a shading rate of the remaining region of the first output image is coarser than a shading rate of the first region of the first output image and a shading rate of the remaining region of the second output image, and the shading rate of the remaining region of the second output image is coarser than a shading rate of the second region of the second output image. Optionally, in this regard, variable shading rates are employed for generating each of the first output image and the second output image. Typically, for generating each pixel of the given output image, shader operations are employed. The shading rate refers to a rate at which the shader operations are employed for generating pixels of the given output image. In an example, a shading rate of 4*4 means that a set of 16 pixels can be shaded using a single shader operation at a given time, a shading rate of 2*2 means that a set of 4 pixels can be shaded using a single shader operation at a given time, and a shading rate of 1*1 means that only 1 pixel can be shaded using a single shader operation at a given time. In this example, the shading rate of 4*4 is coarsest, followed by the shading rate of 2*2, which is followed by the shading rate of 1*1 (which is finest). Therefore, the shading rate of 4*4 results in a poorer resolution than the shading rate of 2*2 which results in a poorer resolution than the shading rate of 1*1. In other words, coarser (namely, lower) the shading rate of the given output image, poorer is the resolution of the given output image, and vice versa. In one case, all pixels in a set of pixels of the given output image are shaded, using the single shader operation, with a same pixel value. In other case, different pixels in the set of pixels of the given output image are shaded, using the single shader operation, with different pixel values.

Herein, the term "pixel value" of a given pixel refers to an overall intensity (namely, brightness) of the given pixel. Notably, the term "overall intensity" of the given pixel has been used to mean any of the following:

- an intensity of the given pixel, said intensity being indicated by a single value lying within a minimum intensity value and a maximum intensity value associated with the given pixel, when the given pixel is a pixel of a grayscale image; or
- an additive intensity of the given pixel, such additive intensity being indicated by a sum of intensity values of different colour channels associated with the given pixel, when the given pixel is a pixel of a colour image.

In an example, when the given output image is a grayscale image, an intensity of a given pixel within the given output image may be equal to 0.2. Said intensity may lie within a minimum intensity value '0' and a maximum intensity value '1' associated with the given pixel. In another example, when the given output image is a Red-Green-Blue (RGB) colour image, a pixel value (i.e. an additive intensity) of a given pixel within the given output image may be equal to 496. Notably, said additive intensity may be a sum of intensity values '64', '224' and '208' of a red colour channel, a green colour channel and a blue colour channel, respectively, that are associated with the given pixel. Upon additive combination of the aforesaid intensity values of the RGB colour channels, a resultant colour of said given pixel is produced to be 'turquoise'.

It will be appreciated that employing shading rates for generating each of the first output image and the second output image is an optimization operation that is optionally performed by the at least one processor. This optimization operation allows for reducing a computational burden on the at least one processor. This is done by selectively employing a finer shading rate for generating a given region of a given output image (notably, the first region of the first output image and/or the second region of the second output image) that corresponds to the gaze region, and employing a coarser shading rate for a remaining region of the given output image (notably, the remaining regions of the first and second output images) that does not correspond to the gaze region. The finer shading rate provides a higher resolution in the given region of the given output image as compared to the coarser shading rate which provides a lower resolution in the remaining region of the given image. In an example, the shading rate of the first region of the first output image may be 2*2, while the shading rate of the remaining region of the first output image may be 4*4. Likewise, the shading rate of the second region of the second output image may be 1*1, while the shading rate of the remaining region of the second output image may be 2*2.

The at least one processor generates the first output image and the second output image in a manner that various regions of the first output image and the second output image are generated from the at least two input images having varying-resolution data. In an example, the first output image is to be displayed via the first light source having a display resolution of 2048*2048 pixels and a field of view of 100 degrees (with an approximate pixel density of 20 pixels per degree (PPD)). The second output image is to be displayed via the second light source having a display resolution of 1024*1024 pixels and a field of view of 20 degrees (with an approximate pixel density of 50 PPD). The gaze region may, for example, have a field of view of 10 degrees. Herein, the at least one processor may be configured to: process the at least one first input image having a resolution of 1024*1024 pixels and a field of view of 10 degrees, to generate the first region of the first output image and the second region of the second output image, as such regions correspond to the gaze region; and process the at least one second input image having a resolution of 1800*1800 pixels and a field of view of 100 degrees, to generate the remaining region of the first output image and the remaining region of the second output image.

Optionally, the at least one processor is configured to post-process the first output image and the second output image prior to displaying via the first light source and the second light source, respectively. In this regard, the post-processing of the first output image and the second output image prior to displaying is a compositing task that is performed to enhance a perceived quality and realism of the first output image and the second output image upon displaying, to provide a rich and immersive viewing experience to the user. The first output image and the second output image can be post-processed by applying at least one post processing operation. Examples of the at least one post-processing operation include vignetting, colour grading, anti-aliasing, temporal filtering, distortion correction, and the like. In an example, the temporal filtering may be performed to reduce jagged lines and/or flicker in the first output image and the second output image. In another example, lens-distortion and colour-distortion correction operations may be performed to adjust visual content of the first output image and the second output image to fit into a setup of the first light source and the second light source and optical element(s) in the HMD.

Upon displaying the first output image and the second output image via the first light source and the second light source, respectively, the projection of the first output image and the projection of the second output image emanate from the first light source and the second light source, respectively. The term "projection of a given output image" refers to a collection of light rays emanating from the given light source when the given output image is displayed via the given light source. The projection of the given output image (namely, the collection of light rays) may transmit through and/or reflect from various optical components of the HMD (for example, such as lenses, mirrors, etc.), before reaching the user's eye. For purposes of embodiments of the present disclosure, the term "projection of the given output image" has been used consistently, irrespective of whether the collection of light rays is transmitted or reflected. It will be appreciated that the term "projection" encompasses light rays emanating from any kind of light source (such as a display or a projector), and should not be construed to be limited to light rays projected by a projector onto a projection screen or the user's eye.

The projection of the first output image and the projection of the second output image are optically combined in the HMD to produce the visual scene in the viewport. Optionally, a portion of the projection of the second output image that corresponds to the second region of the second output image is optically combined with and superimposes upon a portion of the projection of the first output image that corresponds to a portion or an entirety of the first region of the first output image. As a location of the gaze region within the viewport keeps changing, requisite portions of the projections of the first output image and the second output image that need to be optically combined together also keep changing.

Optionally, the projection of the first output image and the projection of the second output image are optically combined by an optical combiner. The term "optical combiner" refers to an optical element for optically combining the projection of the first output image and the projection of the second output image. The optical combiner optically combines the projection of the first output image and the projection of the second output image to produce the visual scene in the viewport of the HMD. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, the resolution of the at least one first input image is higher than a display resolution of the first light source. Optionally, in this regard, the at least one processor is configured to employ super-sampling (namely, anti-aliasing) for the first region the at least one first input image to generate the first region of the first output image, that is to be displayed via the first light source. Super-sampling is a spatial anti-aliasing technique for minimizing distortion artifacts (namely, aliases) when processing a high-resolution image (i.e. the at least one first input image) for generating the first region of the first output image that is to be displayed at a low-display resolution light source. Optionally, when the super-sampling is performed, the first region of the at least one first input image is super-sampled (for example, averaged down to one pixel from a plurality of pixels) to generate the first region of the first output image that is to be displayed at the display resolution of the first light source. As an example, a resolution of the first region of the at least one first input image may be four times the display resolution of the first light source, and therefore, the first region of the at least one first input image may be 4× super-sampled to generate the first region of the first output image prior to displaying at the first light source. Upon generating the first region of the first output image by the super-sampling, the first region of the first output image represents more visual detail than it would have represented if the first region of the first output image had been originally displayed by the at least one processor at the display resolution of the first light source. It will be appreciated that the super-sampling of the first region of the at least one first input image results in smoother, less jagged lines at edges of rendered objects in the first region of the at least one first input image. Thus, the first region of the first output image has more visual detail than the remaining region of the first output image. Beneficially, this improves immersiveness and realism of user's experience within the XR environment.

It will also be appreciated that optionally employing the super-sampling for the first region of the at least one first input image facilitates in blending the first region of the first output image with the second output image and, therefore, provides a smooth transition therebetween. In the visual scene, at least a portion of the first region of the first output image would overlap with the second region of the second output image. Moreover, the first region of the first output image would lie in between the remaining region of the first output image and the second region of the second output image. The remaining region of the first output image and the second region of the second output image are displayed at resolutions which may be considerably different from each other, leading to a perceivable transition therebetween. By super-sampling the first region of the first output image, a smooth imperceptible transition is provided between the remaining region of the first output image and the second region of the second output image, as the first region of the first output image having high visual detail due to super-sampling appears well-blended with the second output image. Beneficially, this improves immersiveness and realism of user's experience within the XR environment.

Optionally, the at least one processor is configured to:
determine a portion of the first region of the first output image that overlaps with the second region of the second output image; and
generate framebuffer data for said portion of the first region of the first output image from framebuffer data available for the second region of the second output image, wherein the generated framebuffer data is to be employed when displaying the first output image.

In some embodiments, an entirety of the first region of the first output image overlaps with the second region of the second output image. As an example, when the gaze region corresponds to the centre of the viewport, the entirety of the first region of the first output image may overlap with the second region of the second output image. In other embodiments, only a certain portion of the first region of the first output image overlaps with the second region of the second output image. As an example, when the gaze region lies about 30 degrees north-west of the centre of the centre of the viewport, only a bottom-right portion of the first region of the first output image may overlap with the second region of the second output image.

Typically, a framebuffer is a portion of a memory comprising framebuffer data (for example, such as a bitmap) that drives the given light source. Optionally, the at least one processor is configured to store a given output image (as framebuffer data) into a given framebuffer associated with the given light source, wherein the given framebuffer drives the given light source to display the given output image via the given light source. Optionally, the framebuffer data available for the second region of the second output image is down-sampled to generate the framebuffer data for the portion of the first region of the first output image that overlaps with the second region of the second output image. When the framebuffer data for said portion of the first region of the first output image generated in such a manner, upon rendering of the first output image and the second output image, the blending of the first output image and the second output image would be smooth, linear and provide an invisible foveated transition from a higher resolution region (the second output image) of the visual scene to a lower resolution region (the first output image) of the visual scene. Moreover, said portion of the first region of the first output image would have a high level of visual detail.

Optionally, the first output image displayed via the first light source has dark pixels in the portion of the first region of the first output image that overlaps with the second region of the second output image. In such a case, the first and second output images are generated (by the at least one processor) in a manner that a corresponding pixel within said portion of the first region of the first output image is darker than a corresponding pixel within the second region of the second output image. As a result, when said portion of the first region of the first output image and the second region of the second output image are optically combined with each other, intensities of their corresponding pixels would be additively combined with each other to provide requisite resultant pixel values (namely, resultant intensities) of pixels in the visual scene. Optionally, the at least one processor employs a low intensity (i.e. a black colour or a dark colour) for rendering the pixels corresponding to the portion of the first region of the first output image that overlaps with the second region of the second output image.

Optionally, the at least one processor is configured to generate the first output image and the second output image in a manner that a first transition area of the first output image fades on going from an outer periphery of the first transition area towards an inner periphery of the first transition area, while a second transition area within the second output image fades on going from an inner periphery of the second transition area towards an outer periphery of the second transition area, wherein a projection of the first transition area is to substantially overlap with a projection of the second transition area when the first and second output images are displayed. Optionally, the first transition area lies along a boundary of the first region of the first output image and the remaining region of the first output image, while the second transition area lies along a boundary of the second region of the second output image and the remaining region of the second output image. Such a manner of fading the first transition area of the first output image and the second transition area within the second output image allows for reducing screen door effect upon overlapping of the projections of the first transition area and the second transition area. Furthermore, the aforesaid manner of fading the first transition area and the second transition area allows for smooth and gradual blending of the projection of the first transition area with the projection of the second transition area when the first and second output images are displayed. Image processing techniques for fading the first transition area and the second transition area are well-known in the art. When the at least one processor optionally implements fading in the aforesaid manner, the first output image and the second output image appear to seamlessly merge into each other, upon being displayed. As a result, the user views a homogenous visual scene having a variable resolution in the viewport, when the first and second output images are displayed at the HMD.

The present disclosure also relates to the method as described above. Various embodiments and variants disclosed above apply mutatis mutandis to the method.

Optionally, when the display apparatus further comprises pose-tracking means, the method further comprises:
  processing pose-tracking data, collected by the pose-tracking means, to determine a head pose of the user; and
  sending, to the rendering server, projection information indicative of the head pose of the user.

Optionally, in the method, a shading rate of the remaining region of the first output image is coarser than a shading rate of the first region of the first output image and a shading rate of the remaining region of the second output image, and the shading rate of the remaining region of the second output image is coarser than a shading rate of the second region of the second output image.

Optionally, in the method, the step of processing the at least one first input image comprises:
  generating the first region of the first output image by resampling a first region of the at least one first input image that corresponds to the first region of the first output image; and
  generating the second region of the second output image by resampling a second region of the at least one first input image that corresponds to the second region of the second output image,
  wherein the first region of the at least one first input image overlaps partially with the second region of the at least one first input image, and wherein the first region and the second region of the at least one first input image are resampled differently.

Optionally, in the method, the step of processing the at least one second input image comprises:
  generating the remaining region of the first output image by resampling a third region of the at least one second input image that corresponds to the remaining region of the first output image; and
  generating the remaining region of the second output image by resampling a fourth region of the at least one second input image that corresponds to the remaining region of the second output image, wherein the third region and the fourth region of the at least one second input image are resampled differently.

Optionally, in the method, the resolution of the at least one first input image is higher than a display resolution of the first light source.

Optionally, the method further comprises:

determining a portion of the first region of the first output image that overlaps with the second region of the second output image; and generating framebuffer data for said portion of the first region of the first output image from framebuffer data available for the second region of the second output image, wherein the generated framebuffer data is employed when displaying the first output image.

Optionally, the method further comprises:

determining a quality of the gaze-tracking data; and adjusting a size of the gaze region based on the quality of the gaze-tracking data.

DETAILED DESCRIPTION OF THE DRAWINGS

Figure 1:
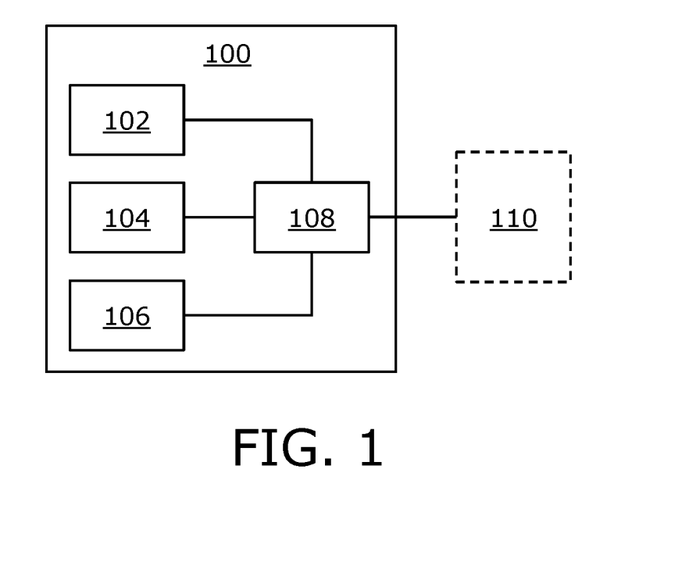
FIGS. 1 and 2 illustrate block diagrams of architectures of a display apparatus, in accordance with different embodiments of the present disclosure.

Referring to FIG. 1, illustrated is a block diagram of architecture of a display apparatus 100, in accordance with an embodiment of the present disclosure. The display apparatus 100 comprises a first light source 102 and a second light source 104 per eye, gaze-tracking means 106, and at least one processor (depicted as a processor 108). The processor 108 is communicably coupled to the first light source 102, the second light source 104, and the gaze-tracking means 106. The processor 108 is also communicably coupled to a rendering server 110.

Figure 2:
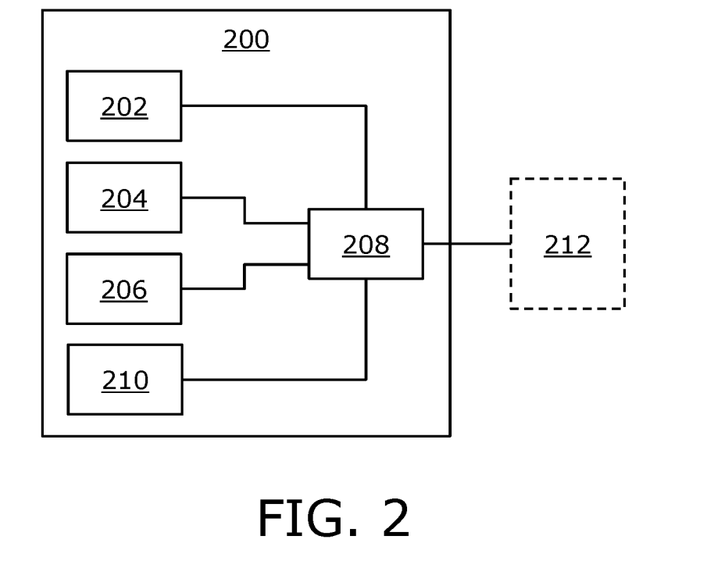

Referring to FIG. 2, illustrated is a block diagram of architecture of a display apparatus 200, in accordance with another embodiment of the present disclosure. The display apparatus 200 comprises a first light source 202 and a second light source 204 per eye, gaze-tracking means 206, at least one processor (depicted as a processor 208), and pose-tracking means 210. The processor 208 is communicably coupled to the first light source 202, the second light source 204, the gaze-tracking means 206, and the pose-tracking means 210. The processor 208 is also communicably coupled to a rendering server 212.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure. As an example, the display apparatuses 100 and 200 may also comprise an optical combiner (not shown).

Figure 3A:
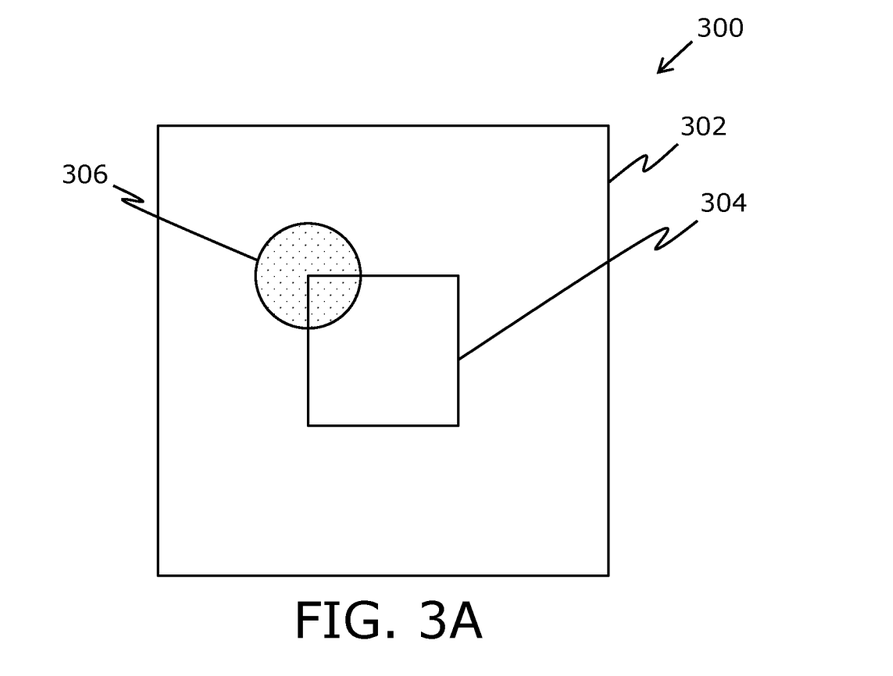
FIG. 3A illustrates an exemplary visual scene.
Figure 3B:
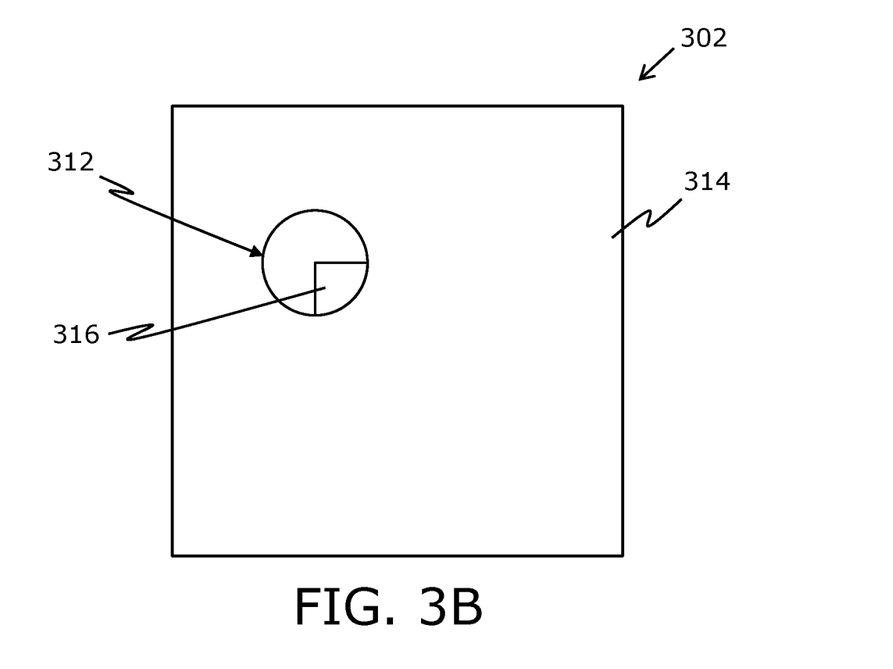
FIG. 3B illustrates a first output image.
Figure 3C:
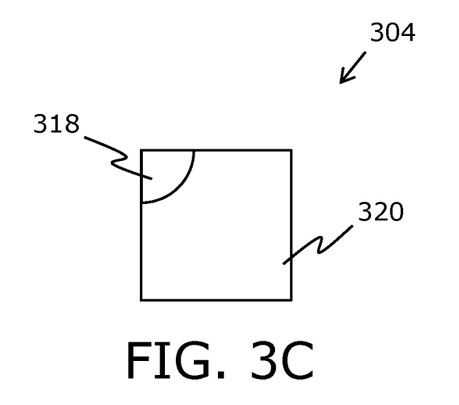
FIG. 3C illustrates a second output image.
Figure 3D:
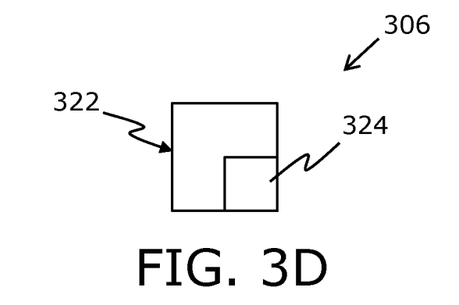
Figure 3E:
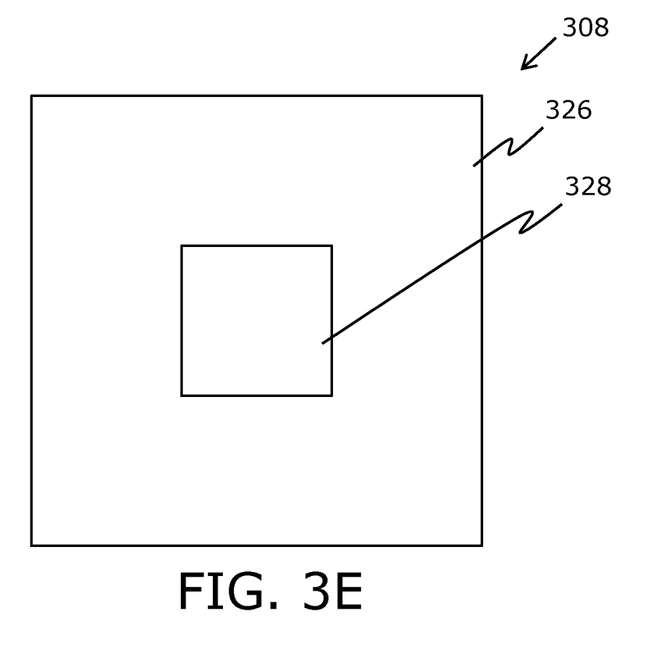
FIG. 3E illustrates a second input image, in accordance with an embodiment of the present disclosure.

Referring to FIGS. 3A, 3B and 3C, FIG. 3A is an illustration of an exemplary visual scene 300, FIG. 3B is an illustration of a first output image 302, FIG. 3C is an illustration of a second output image 304, FIG. 3D is an illustration of a first input image 306, while FIG. 3E is an illustration of a second input image 308, in accordance with an embodiment of the present disclosure.

In FIG. 3A, the visual scene 300 is produced using the first output image 302 and the second output image 304. The visual scene 300 is produced in a viewport. A gaze region 310 (depicted as a dotted region lying within a circle) is identified based on a gaze direction of a user, within the viewport.

In FIG. 3B, the first output image 302 is shown to comprise a first region 312 that is to be displayed in a first portion of the gaze region 310, and a remaining region 314 that does not correspond to (or does not overlap with) the gaze region 310. The first region 312 is depicted, for example, as a circular region. There is also shown a portion 316 of first region 312 of the first output image 302 that overlaps with a second region 318 of the second output image 304 (shown in FIG. 3C).

In FIG. 3C, the second output image 304 is shown to comprise the second region 318 that is to be displayed in a second portion of the gaze region 310, and a remaining region 320 that does not correspond to (or does not overlap with) the gaze region 310.

In FIG. 3D, the first input image 306 is shown to comprise a first region 322 (depicted as a big rectangle) that corresponds to the first region 312 of the first output image 302, and a second region 324 (depicted as a small rectangle) that corresponds to the second region 318 of the second output image 304. The first region 322 overlaps partially with the second region 324. The first region 322 is resampled to generate the first region 312 of the first output image 302 (of FIG. 3B), and the second region 324 is resampled to generate the second region 318 of the second output image 304 (of FIG. 3C).

In FIG. 3E, the second input image 308 is shown to comprise a third region 326 that corresponds to the remaining region 314 of the first output image 302, and a fourth region 328 that corresponds to the remaining region 320 of the second output image 304. The third region 326 is resampled to generate the remaining region 314 of the first output image 302 (of FIG. 3B), and the fourth region 328 is resampled to generate the remaining region 320 of the second output image 304 (of FIG. 3C).

Figure 4A:
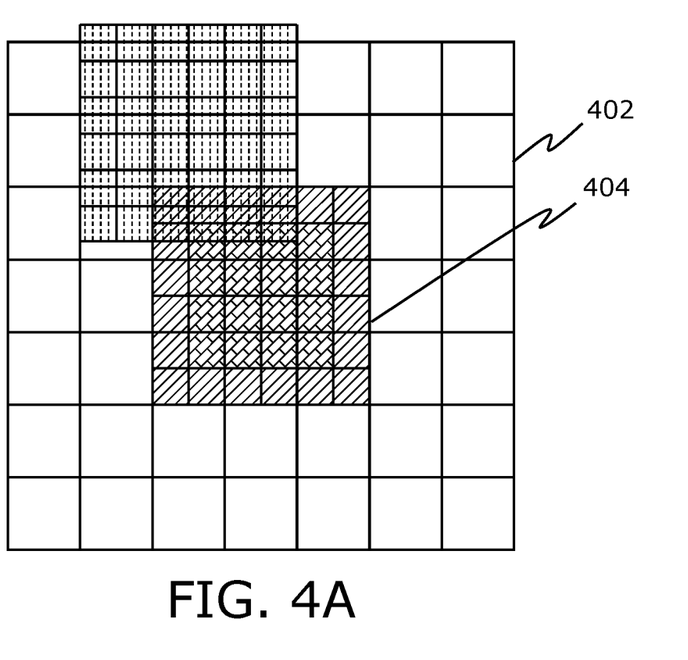
FIGS. 4A and 4B illustrate two exemplary scenarios of blending, in accordance with different embodiments of the present disclosure.

FIG. 4A illustrates an exemplary scenario of blending, in accordance with an embodiment of the present disclosure. In this exemplary scenario, a gaze region within a viewport lies away from a centre of the viewport. The viewport is provided by a first light source (not shown) and a second light source (not shown) via which a first output image 402 and a second output image 404, respectively, are displayed. Herein, the blending that occurs between the first output image 402 and the second output image 404 is shown. A pixel value of a given pixel in a first region of the first output image (that corresponds to a first portion of the gaze region, and is depicted as a grid of pixels with vertical dotted lines hatch) lying in a blending zone (depicted as diagonal stripes pattern) of the first output image 402 and the second output image 404, is determined to based on a pixel value of a corresponding pixel in the second output image 404. As an example, the intensity of the given pixel of the first region lying in the blending zone may be obtained by super-sampling intensities of corresponding pixels in the second output image 404, as a high-resolution pixel values are available for pixels of the second output image 404. A region of the second output image 404 that does not correspond to the blending zone is depicted as diagonal brick pattern. Moreover, an intensity of multiple pixels in the first region of the first output image 402 may be super-sampled to obtain an intensity of one pixel in a remaining region (depicted as largest-sized un-hatched pixels) of the first output image 402. This improves image quality in the remaining region of the first output image 402, and also provides a smooth blending transition between the second output image 404 and the remaining region of the first output image 402.

Figure 4B:
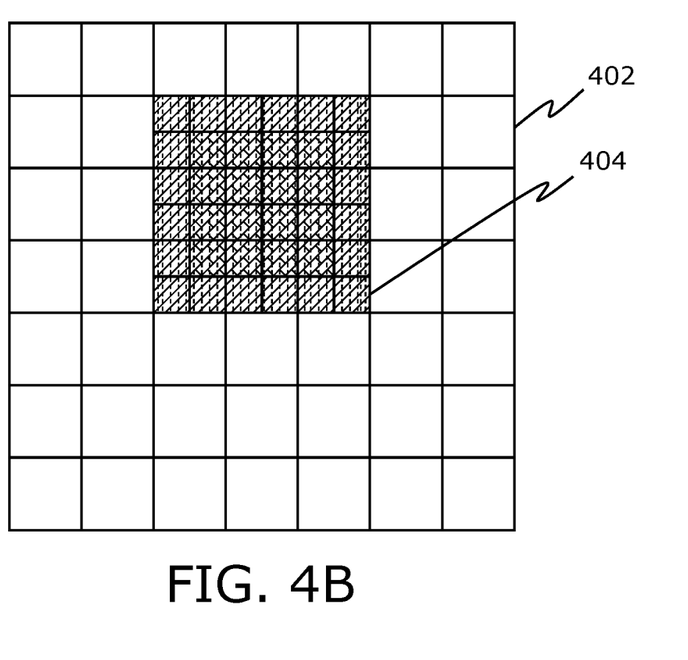

FIG. 4B illustrates another exemplary scenario of blending, in accordance with another embodiment of the present disclosure. In this exemplary scenario, a gaze region within a viewport lies at a centre of the viewport. The viewport is provided by a first light source (not shown) and a second light source (not shown) via which a first output image 402 and a second output image 404, respectively, are displayed. A blending zone (depicted as diagonal stripes pattern) is shown to include pixels corresponding to a remaining region of the second output image 404, as well as some pixels corresponding to a first region of the first output image 402 (the first region being depicted as vertical dotted lines hatch). Moreover, some other pixels corresponding to the first region of the first output image 402 are shown to be blended with pixels corresponding to a second region of the second output image 404 (the second region being depicted as a diagonal brick pattern). Super-sampling may be employed to determine an intensity of a given pixel of the first region of the first output image 402 based on intensities of corresponding pixels in the second output image 404.

Figure 5A:
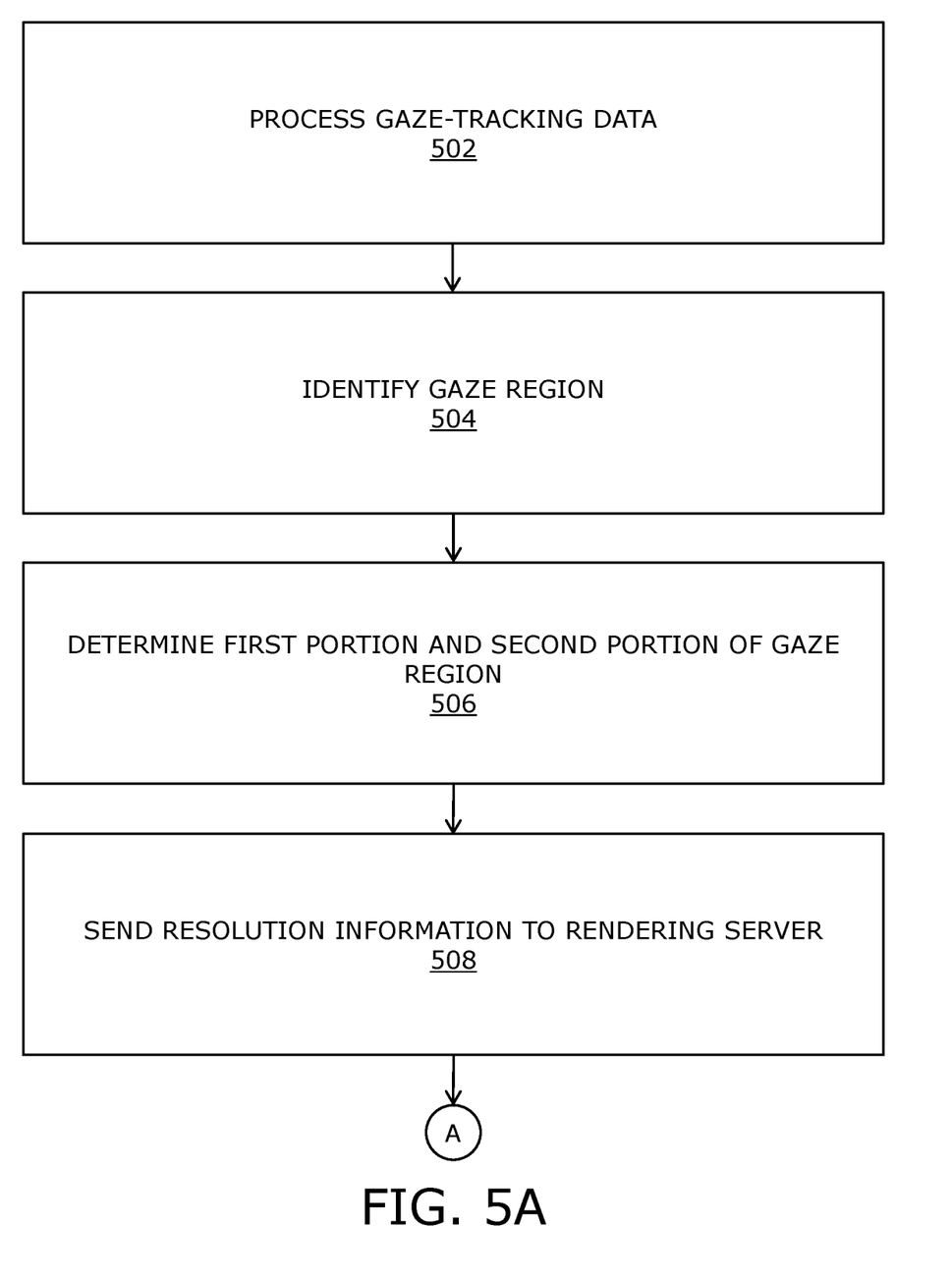
FIGS. 5A and 5B illustrate steps of a method of displaying, in accordance with an embodiment of the present disclosure.
Figure 5B:
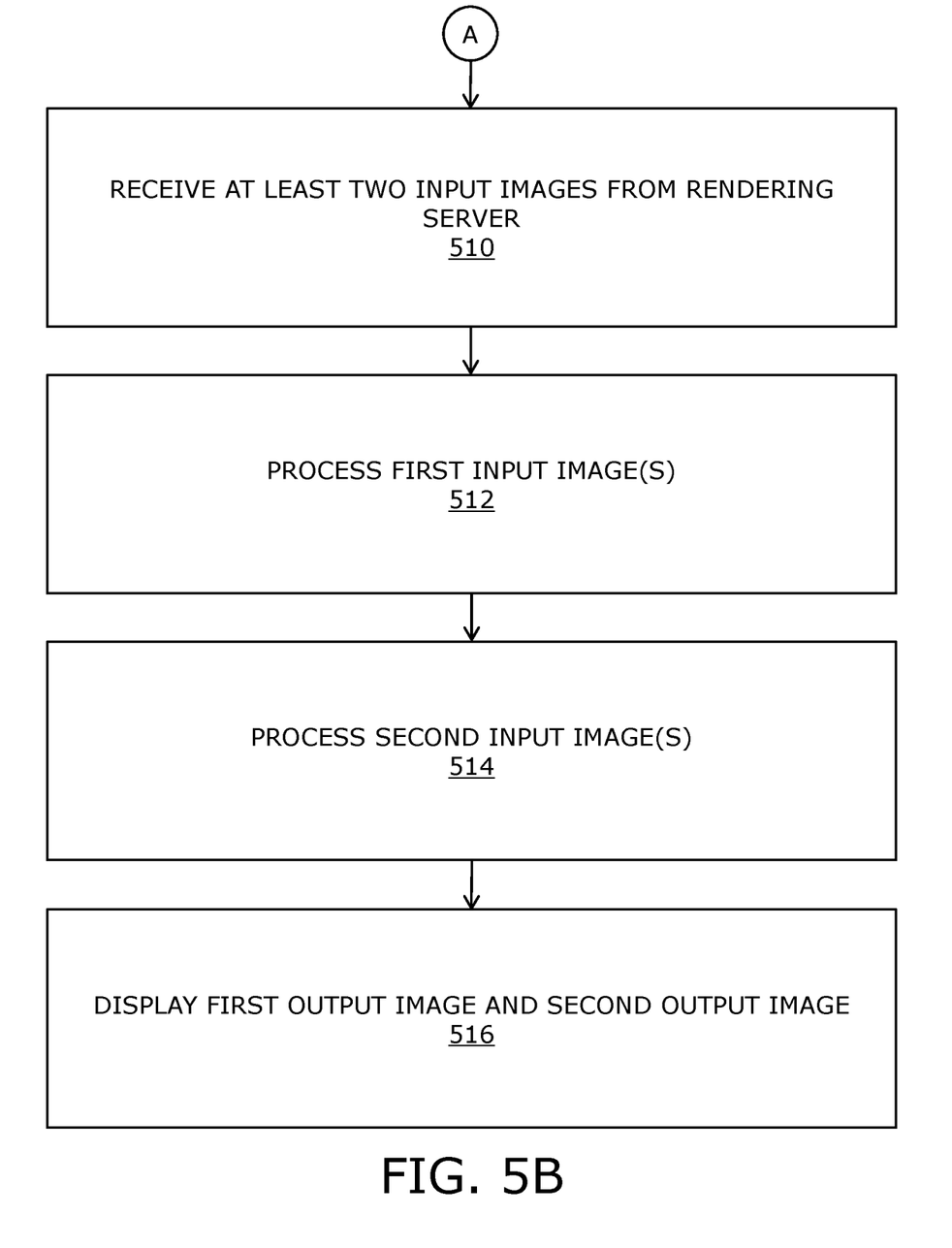

Referring to FIGS. 5A and 5B, illustrated are steps of a method of displaying, in accordance with an embodiment of the present disclosure. The method is implemented by a display apparatus comprising a first light source and a second light source per eye and gaze-tracking means. At step 502, gaze-tracking data, collected by the gaze-tracking means, is processed to determine a gaze direction of a user. At step 504, a gaze region is identified within a viewport provided by the first light source and the second light source, based on the gaze direction. At step 506, a first portion and a second portion of the gaze region are determined, in which a first region of a first output image and a second region of a second output image are to be displayed, respectively. At step 508, resolution information indicative of at least one of: the gaze direction of the user, the gaze region within the viewport, the first portion and the second portion of the gaze region, different resolutions in which at least two input images are required, is sent to a rendering server. At step 510, the at least two input images are received from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image. At step 512, the at least one first input image is processed to generate the first region of the first output image and the second region of the second output image. At step 514, the at least one second input image is processed to generate a remaining region of the first output image and a remaining region of the second output image. At step 516, the first output image and the second output image are displayed via the first light source and the second light source, respectively, a projection of the first output image and a projection of the second output image producing a visual scene in the viewport.

The steps 502, 504, 506, 508, 510, 512, 514, and 516 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
a first light source and a second light source per eye, the first light source and the second light source being employed to provide a viewport;
gaze-tracking means; and
at least one processor configured to:
  process gaze-tracking data, collected by the gaze-tracking means, to determine a gaze direction of a user;
  identify, based on the gaze direction, a gaze region within the viewport;
  determine a first portion and a second portion of the gaze region in which a first region of a first output image and a second region of a second output image are to be displayed, respectively;
  send, to a rendering server, resolution information indicative of at least one of: the gaze direction of the user, the gaze region within the viewport, the first portion and the second portion of the gaze region, different resolutions in which at least two input images are required;
  receive the at least two input images from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image;
  process the at least one first input image to generate the first region of the first output image and the second region of the second output image by resampling a first region of the at least one first input image that corresponds to the first region of the first output image to match a display resolution of the first light source, and by resampling a second region of the at least one first input image that corresponds to the second region of the second output image to match a display resolution of the second light source;
  process the at least one second input image to generate a remaining region of the first output image and a remaining region of the second output image; and
  display the first output image and the second output image via the first light source and the second light source, respectively, a projection of the first output image and a projection of the second output image producing a visual scene in the viewport.

2. The display apparatus of claim 1, further comprising pose-tracking means, wherein the at least one processor is configured to:
process pose-tracking data, collected by the pose-tracking means, to determine a head pose of the user; and
send, to the rendering server, projection information indicative of the head pose of the user.

3. The display apparatus of claim 1, wherein a shading rate of the remaining region of the first output image is coarser than a shading rate of the first region of the first output image and a shading rate of the remaining region of the second output image, and wherein the shading rate of the remaining region of the second output image is coarser than a shading rate of the second region of the second output image.

4. The display apparatus of claim 1,
wherein the first region of the at least one first input image overlaps partially with the second region of the at least one first input image, and wherein the first region and the second region of the at least one first input image are resampled differently.

5. The display apparatus of claim 1, wherein, when processing the at least one second input image to generate the remaining region of the first output image and the remaining region of the second output image, the at least one processor is configured to:
   generate the remaining region of the first output image by resampling a third region of the at least one second input image that corresponds to the remaining region of the first output image; and
   generate the remaining region of the second output image by resampling a fourth region of the at least one second input image that corresponds to the remaining region of the second output image,
   wherein the third region and the fourth region of the at least one second input image are resampled differently.

6. The display apparatus of claim 1, wherein the resolution of the at least one first input image is higher than a display resolution of the first light source.

7. The display apparatus of claim 1, wherein the at least one processor is configured to:
   determine a portion of the first region of the first output image that overlaps with the second region of the second output image; and
   generate framebuffer data for said portion of the first region of the first output image from framebuffer data available for the second region of the second output image, wherein the generated framebuffer data is to be employed when displaying the first output image.

8. The display apparatus of claim 1, wherein the at least one processor is configured to:
   determine a quality of the gaze-tracking data; and
   adjust a size of the gaze region based on the quality of the gaze-tracking data.

9. A method of displaying, the method being implemented by a display apparatus comprising a first light source and a second light source per eye and gaze-tracking means, the method comprising:
   processing gaze-tracking data, collected by the gaze-tracking means, to determine a gaze direction of a user;
   identifying, based on the gaze direction, a gaze region within a viewport provided by the first light source and the second light source;
   determining a first portion and a second portion of the gaze region in which a first region of a first output image and a second region of a second output image are to be displayed, respectively;
   sending, to a rendering server, resolution information indicative of at least one of: the gaze direction of the user, the gaze region within the viewport, the first portion and the second portion of the gaze region, different resolutions in which at least two input images are required;
   receiving the at least two input images from the rendering server, wherein the at least two input images comprise at least one first input image corresponding to the gaze region within the viewport and at least one second input image corresponding to an entire field of view of the viewport, a resolution of the at least one first input image being higher than a resolution of the at least one second input image;
   processing the at least one first input image to generate the first region of the first output image and the second region of the second output image by resampling a first region of the at least one first input image that corresponds to the first region of the first output image to match a display resolution of the first light source, and by resampling a second region of the at least one first input image that corresponds to the second region of the second output image to match a resolution of the second light source;
   processing the at least one second input image to generate a remaining region of the first output image and a remaining region of the second output image; and
   displaying the first output image and the second output image via the first light source and the second light source, respectively, a projection of the first output image and a projection of the second output image producing a visual scene in the viewport.

10. The method of claim 9, wherein the display apparatus further comprises pose-tracking means, the method further comprising:
    processing pose-tracking data, collected by the pose-tracking means, to determine a head pose of the user; and
    sending, to the rendering server, projection information indicative of the head pose of the user.

11. The method of claim 9, wherein a shading rate of the remaining region of the first output image is coarser than a shading rate of the first region of the first output image and a shading rate of the remaining region of the second output image, and wherein the shading rate of the remaining region of the second output image is coarser than a shading rate of the second region of the second output image.

12. The method of claim 9,
    wherein the first region of the at least one first input image overlaps partially with the second region of the at least one first input image, and wherein the first region and the second region of the at least one first input image are resampled differently.

13. The method of claim 9, wherein the step of processing the at least one second input image comprises:
    generating the remaining region of the first output image by resampling a third region of the at least one second input image that corresponds to the remaining region of the first output image; and
    generating the remaining region of the second output image by resampling a fourth region of the at least one second input image that corresponds to the remaining region of the second output image,
    wherein the third region and the fourth region of the at least one second input image are resampled differently.

14. The method of claim 9, wherein the resolution of the at least one first input image is higher than a display resolution of the first light source.

15. The method of claim 9, further comprising:
    determining a portion of the first region of the first output image that overlaps with the second region of the second output image; and
    generating framebuffer data for said portion of the first region of the first output image from framebuffer data available for the second region of the second output image, wherein the generated framebuffer data is employed when displaying the first output image.

16. The method of claim 9, further comprising:
    determining a quality of the gaze-tracking data; and
    adjusting a size of the gaze region based on the quality of the gaze-tracking data.

* * * * *